United States Patent [19]
Handa

[11] Patent Number: 6,118,610
[45] Date of Patent: Sep. 12, 2000

[54] SERVO INFORMATION REPRODUCING METHOD AND MAGNETIC DISK UNIT WITH SENSE CURRENT CONTROL

[75] Inventor: Yoichi Handa, Kawasaki, Japan

[73] Assignee: Fujitsu Limited, Kawasaki, Japan

[21] Appl. No.: 09/017,374

[22] Filed: Feb. 2, 1998

[30] Foreign Application Priority Data

Jul. 22, 1997 [JP] Japan .................................. 9-195957

[51] Int. Cl.[7] ...................................... G11B 5/03
[52] U.S. Cl. ............................................ 360/66
[58] Field of Search ............................. 360/66, 46, 113, 360/77.08

[56] References Cited

U.S. PATENT DOCUMENTS 5,461,517  10/1995  Suda et al. ................................ 360/66

FOREIGN PATENT DOCUMENTS 409171601A  6/1997  Japan .

*Primary Examiner*—W. Chris Kim
*Attorney, Agent, or Firm*—Greer, Burns & Crain, Ltd.

[57] ABSTRACT

A servo information reproducing method reproduces servo information from a recording medium by a head, where servo regions recorded with the servo information and data regions recorded with data coexist on the recording medium. The servo information reproducing method includes a setting step for setting a sense current which is supplied to the head when reproducing the servo information from the servo region to a value larger than that of a sense current which is supplied to the head when reproducing the data from the data region.

10 Claims, 10 Drawing Sheets

SERVO INFORMATION REPRODUCING METHOD AND MAGNETIC DISK UNIT WITH SENSE CURRENT CONTROL

BACKGROUND OF THE INVENTION

The present invention generally relates to servo information reproducing methods and magnetic disk units, and more particularly to a servo information reproducing method for accurately reproducing servo information and to a magnetic disk unit which employs such a servo information reproducing method.

In magnetic disk units, a recording density of a magnetic disk is improved by taking measures such as reducing a track pitch on the magnetic disk. Servo information that is used to detect a position on the magnetic disk is recorded on the magnetic disk, and there are demands to accurately reproduce the servo information even when the track pitch is reduced.

FIG. 1 is a diagram showing a magnetic disk 100 having a recording surface on which servo regions 101 recorded with servo information and data regions 102 recorded with data coexist. For example, each cylinder (or track) on the recording surface of the magnetic disk 100 is provided with 50 to 100 servo regions 101.

FIG. 2 is a diagram showing a track pattern for a case where each track is provided with 60 servo regions 101-1 through 101-60, for example. In FIG. 2, when the rotational speed of the magnetic disk 100 is 5400 rpm, each of the servo regions 101-1 through 101-60 are 30 $\mu$sec, for example, and 1 track is approximately 11.1 msec.

In the data region 102 shown in FIG. 1, the data is recorded with a recording format shown in FIG. 3. In FIG. 3 and FIG. 4 which will be described later, R denotes a radial direction of the magnetic disk 100, and an arrow extending in a horizontal direction indicates the magnetization direction. Each of tracks T1 and T2 is recorded by a head having a write core width WW, and a dead space DS is formed between the two adjacent tracks T1 and T2.

On the other hand, in the servo region 101 shown in FIG. 1, the servo information is recorded with a recording format shown in FIG. 4. In other words, the servo information is recorded consecutively without forming a dead space between the adjacent tracks, so that it is possible to reproduce the servo information regardless of the position of the head on the magnetic disk 100. A head having a write core width WW wider than a servo track width SW is used to record the servo information, so that the write core width WW partially overlaps when recording the adjacent servo tracks. That is, an overwrite portion OVR is formed as shown in FIG. 5 because the adjacent servo tracks are formed while partially overwriting the previously formed one of the adjacent servo tracks. A head having a read core width RW which is narrower than the write core width WW is used when reproducing the servo information.

In addition, when recording the servo information by the head, information erasure occurs on both sides of the head due to the characteristic of the head. This information erasure is the so-called side erase. This side erase does not become a problem in the data region 102 where the dead space DS is formed between the adjacent tracks T1 and T2. However, since no dead space is formed in the servo region 101, the servo information recorded in the servo region 101 is erased by a side erase SE at one side of the overwrite portion OVR as shown in FIG. 5.

Conventionally, the read core width RW is considerably wider compared to the width of the side erase SE, that is, RW>>SE. For this reason, a decrease in the reproduced output level of the servo information caused by the side erase SE is on the order of approximately 10%, for example, and no serious problem is introduced by the side erase SE.

But as the recording density of the magnetic disk 100 increases and the track pitch becomes extremely small, the relationship between the read core width RW and the width of the side erase SE becomes RW>SE, and the ratio of the width of the side erase SE with respect to the read core width RW increases. As a result, there was a problem in that the effects of the side erase SE on the reproduced output level of the servo information can no longer be neglected.

More particularly, when the track pitch becomes small, the write core width WW and the read core width RW become narrow. On the other hand, the width of the side erase SE is independent of the write core width WW, and is approximately 0.2 $\mu$m, for example, and is substantially constant. FIG. 6 is a diagram for explaining a case where the side erase SE exists in the servo region 101. In this case, when the data region 102 is reproduced by the read core width RW as indicated by the hatching in FIG. 6, it is possible to satisfactorily reproduce the data because the data is recorded with the write core width WW which is wider than the read core width RW. On the other hand, in the servo region 101, the side erase SE is generated at positions shown in FIG. 6 due to the overwriting described above. Hence, when the servo region 101 is reproduced by the read core width RW, the side erase SE occupies a relatively large portion of the reproduced part, and the reproduced output level of the servo information greatly decreases. For example, the decrease of the reproduced output level of the servo information is approximately 30%. A reproduced output SOE of the servo information for the case where the side erase SE exists can be described by SOE≈{(RW−SE)/RW}·SO, where SO denotes a reproduced output of the servo information for a case where no side erase SE exists, and SE denotes the width of the side erase SE.

When the reproduced output level of the servo information greatly decreases, there were problems in that it is impossible to accurately reproduce the servo information, and that it is impossible to accurately carry out a position control of the head with respect to the magnetic disk 100.

SUMMARY OF THE INVENTION

Accordingly, it is a general object of the present invention to provide a novel and useful servo information reproducing method and magnetic disk unit, in which the problems described above are eliminated.

Another and more specific object of the present invention is to provide a servo information reproducing method and a magnetic disk unit which can positively and accurately reproduce servo information even when a track pitch becomes narrow.

Still another object of the present invention is to provide a servo information reproducing method for reproducing servo information from a recording medium by a head, where servo regions recorded with the servo information and data regions recorded with data coexist on the recording medium, and the servo information reproducing method comprises a setting step for setting a sense current which is supplied to the head when reproducing the servo information from the servo region to a value larger than that of a sense current which is supplied to the head when reproducing the data from the data region. According to the servo information reproducing method of the present invention, it is possible to positively and accurately reproduce the servo information even when the track pitch on the recording medium becomes narrow.

A further object of the present invention is to provide a magnetic disk unit for reproducing servo information and data from at least one magnetic disk on which servo regions recorded with the servo information and data region recorded with the data coexist, comprising at least one head reproducing the servo information and the data from the magnetic disk in response to a sense current, and a controller setting a value of the sense current which is supplied to the head when reproducing the servo information from the servo region to a first value which is larger than a second value of the sense current which is supplied to the head when reproducing the data from the data region. According to the magnetic disk unit of the present invention, it is possible to positively and accurately reproduce the servo information even when the track pitch on the magnetic disk becomes narrow.

Other objects and further features of the present invention will be apparent from the following detailed description when read in conjunction with the accompanying drawings.

DESCRIPTION OF THE PREFERRED EMBODIMENTS

Figure 7:
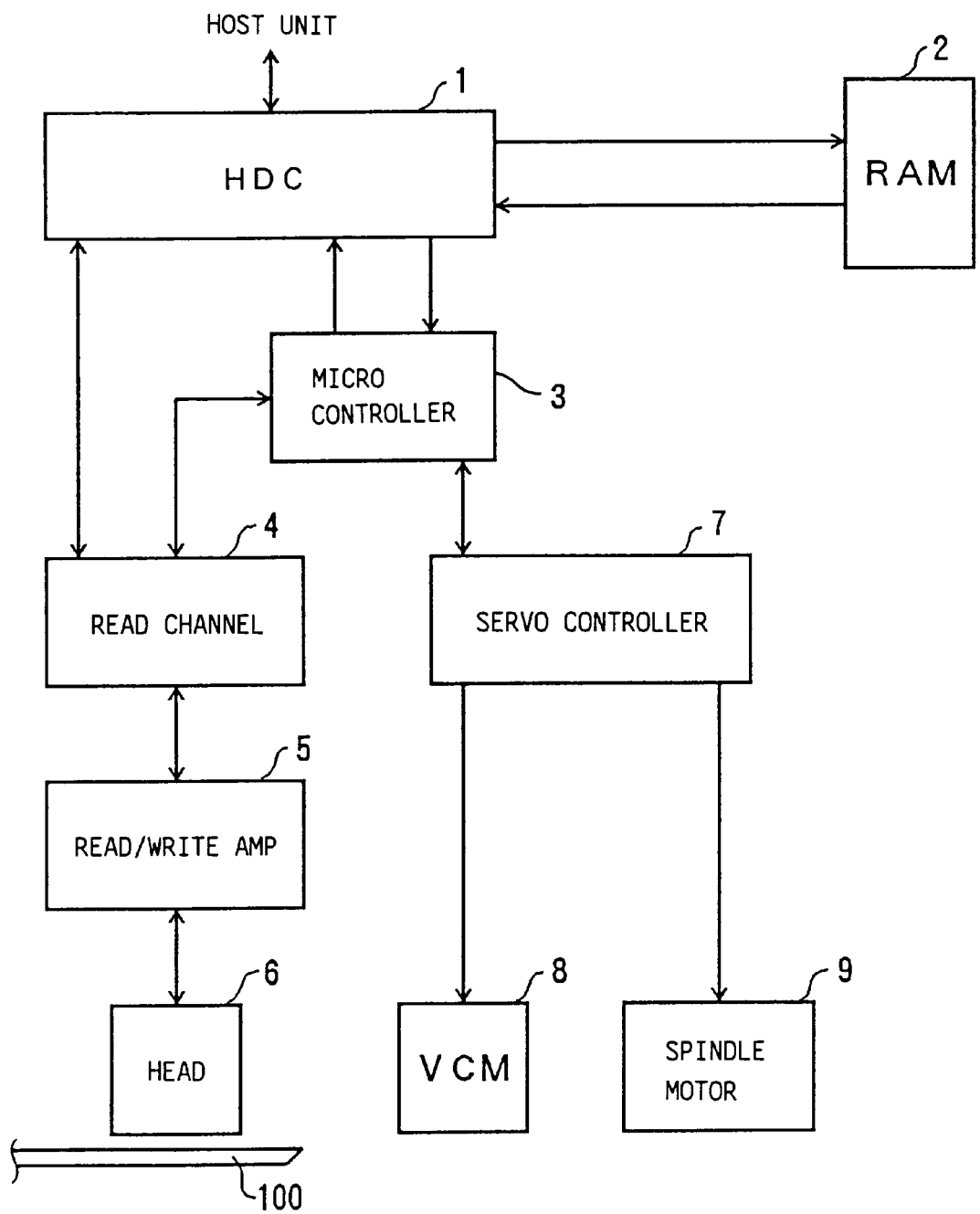
FIG. 7 is a system block diagram showing an important part of an embodiment of a magnetic disk unit according to the present invention.

FIG. 7 is a system block diagram showing an important part of an embodiment of a magnetic disk unit according to the present invention. This embodiment of the magnetic disk unit employs an embodiment of a servo information reproducing method according to the present invention.

Figure 1:
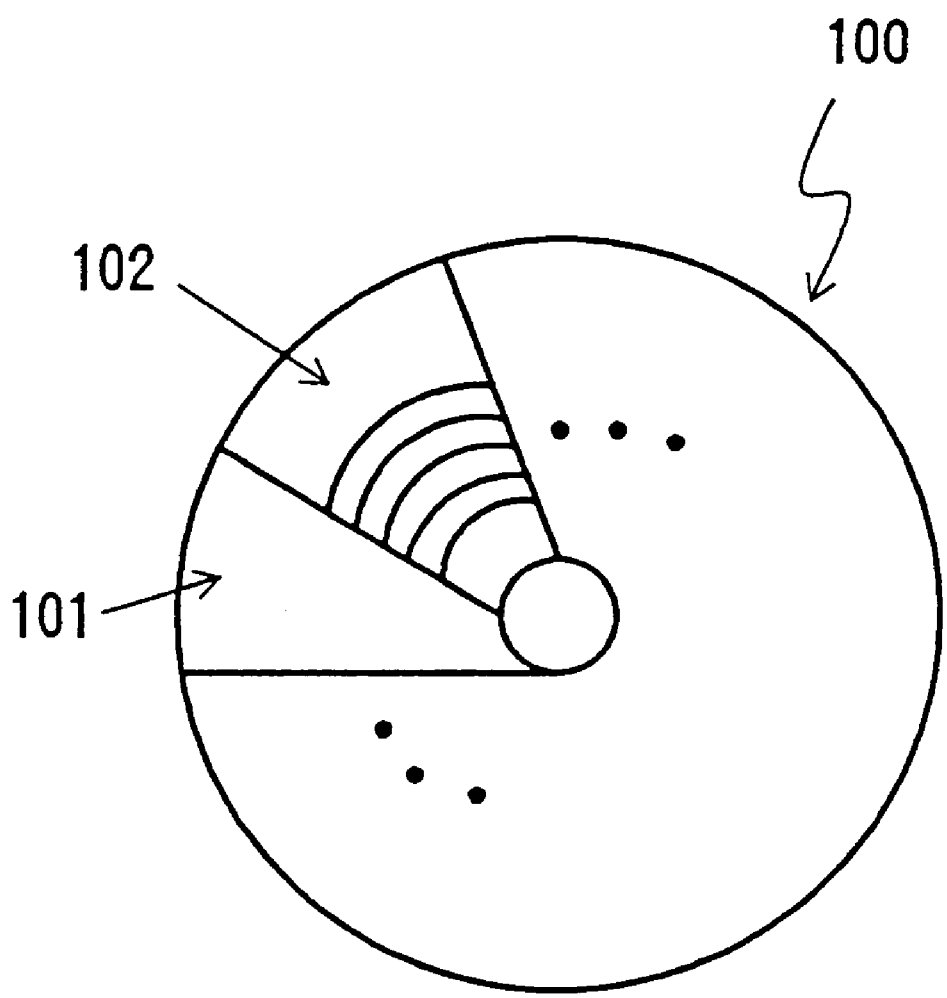
FIG. 1 is a diagram showing a magnetic disk having a recording surface on which servo regions and data regions coexist.
Figure 2:
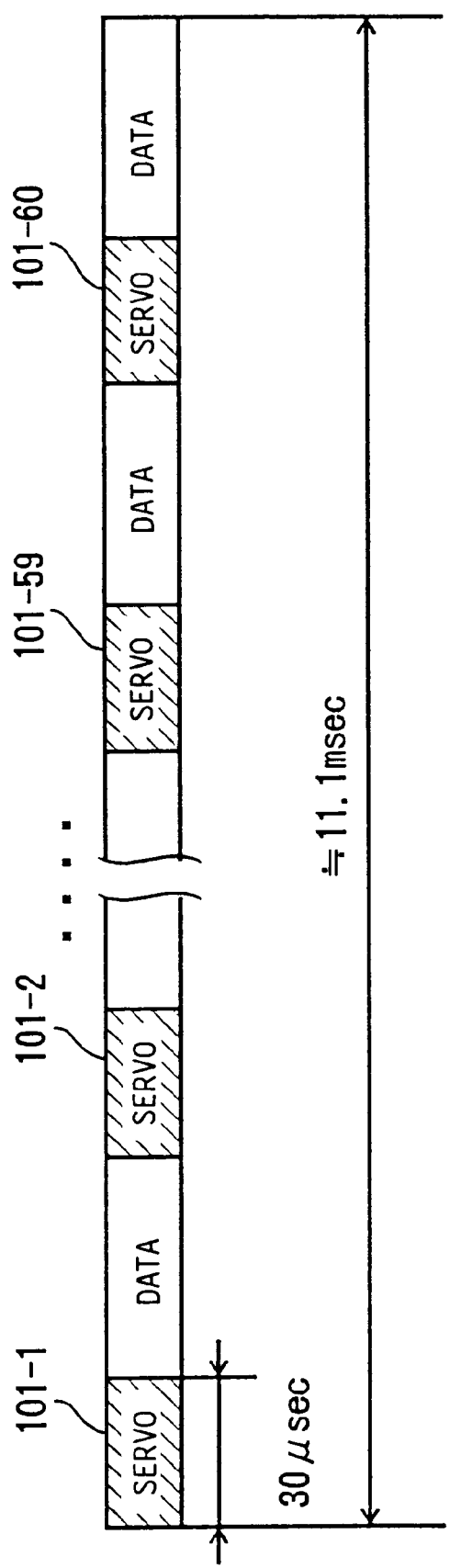
FIG. 2 is a diagram showing a track pattern for a case where 60 servo regions are provided in each track.
Figure 3:
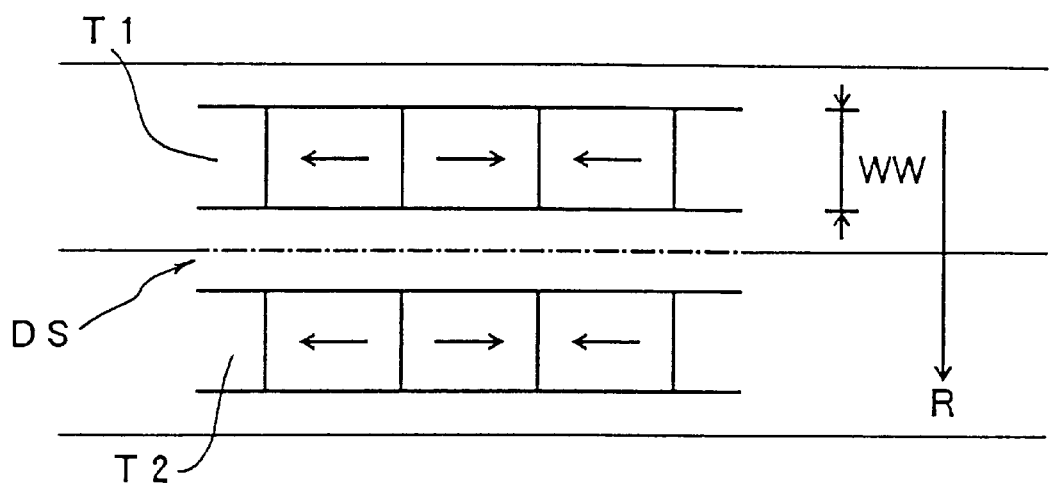
FIG. 3 is a diagram for explaining a recording format of the data region.
Figure 4:
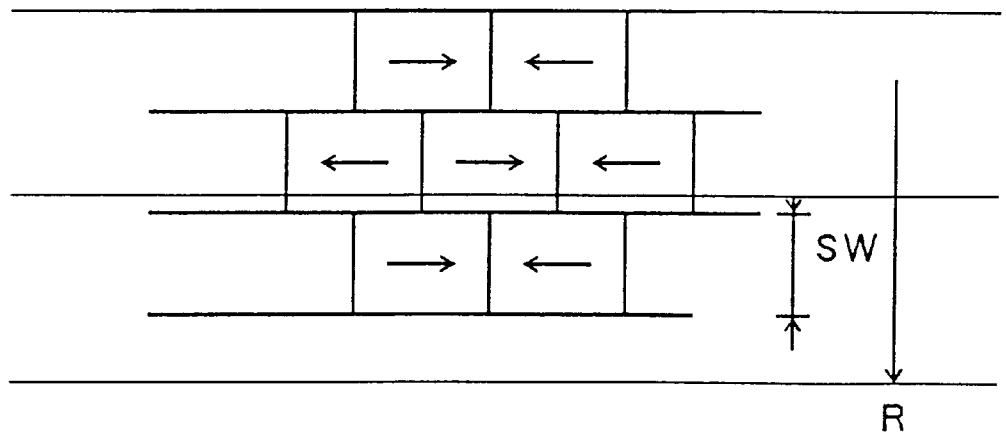
FIG. 4 is a diagram for explaining a recording format of the servo region.
Figure 5:
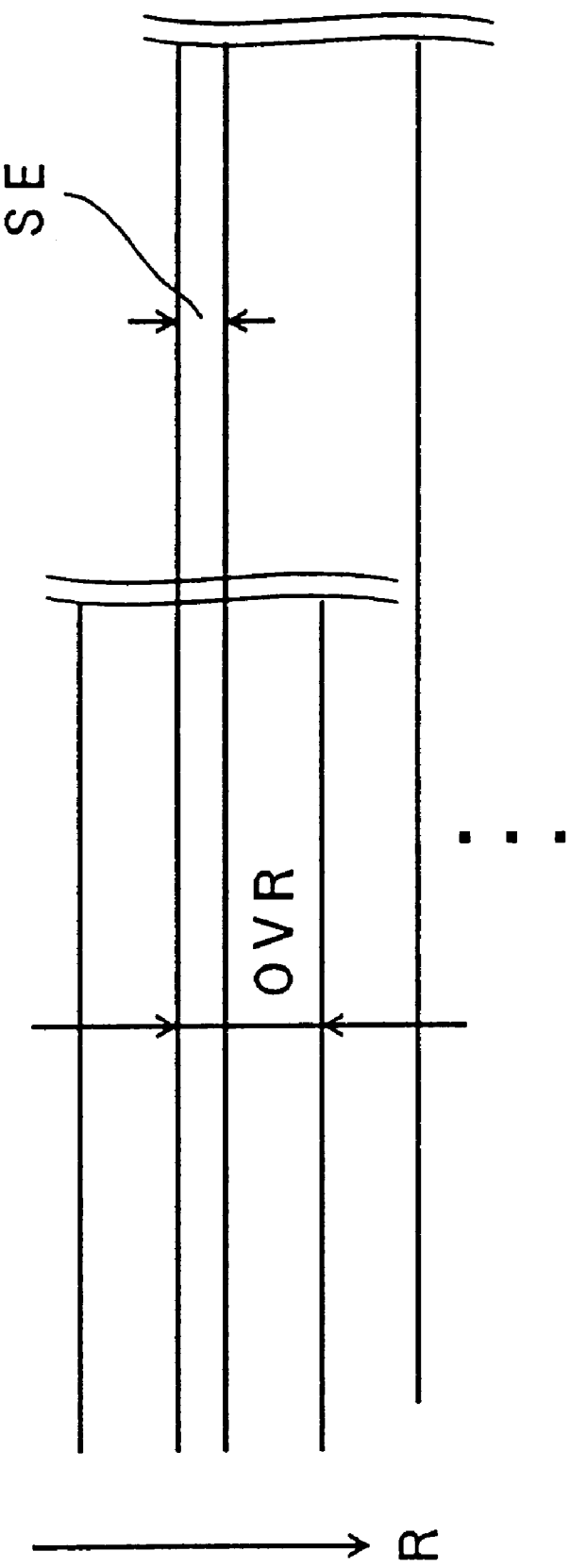
FIG. 5 is a diagram for explaining a side erase.
Figure 6:
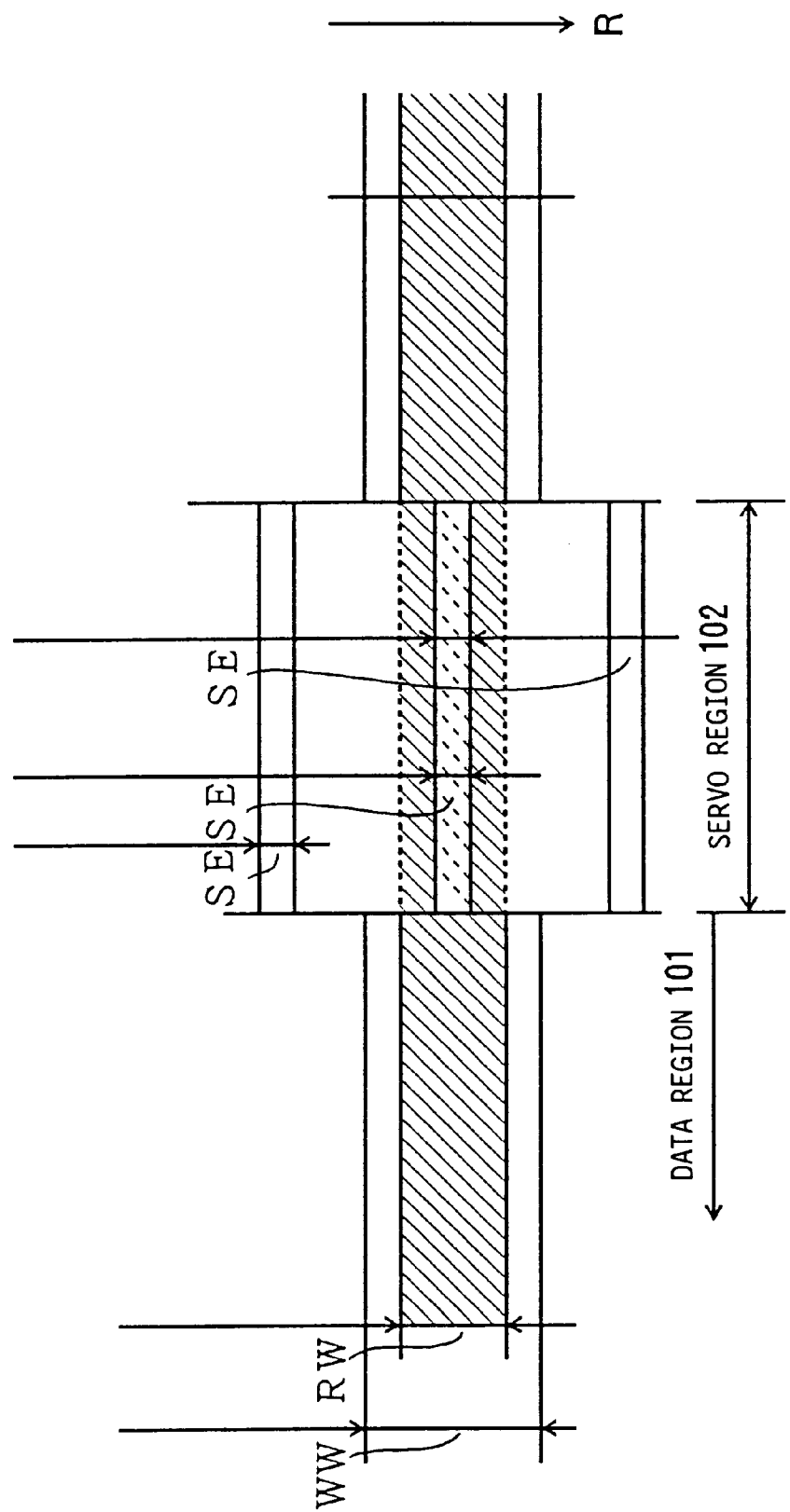
FIG. 6 is a diagram for explaining a decrease of a reproduced output level of servo information caused by the side erase.

In FIG. 7, the magnetic disk unit generally includes a hard disk controller (HDC) 1, a random access memory (RAM) 2, a micro controller 3, a read channel 4, a read/write amplifier 5, a head 6, a servo controller 7, a voice coil motor (VCM) 8, a spindle motor 9, and a magnetic disk 100. For the sake of convenience, it is assumed that the head 6 includes a magnetoresistance (MR) head which is used for data reproduction. Although only one head 6 is shown in FIG. 1 to simplify the drawing, it is of course possible to provide a plurality of heads, and in this case, it is possible to provide a plurality of magnetic disks 100. In addition, it is assumed for the sake of convenience that the magnetic disk 100 itself is the same as the magnetic disk 100 described above with reference to FIGS. 1 through 4.

The HDC 1 controls the operation of the entire magnetic disk unit, and is coupled to a host unit (not shown) such as a personal computer. The RAM 2 stores data including intermediate data which are obtained during operations carried out by the HDC 1. The micro controller 3 controls the read channel 4 and the servo controller 7 under the control of the HDC 1. At the time of the data recording, the read channel 4 supplies the data which is obtained from the host unit via the HDC 1 to the head 6 via the read/write amplifier 5, so as to record the data on the magnetic disk 100. On the other hand, at the time of the data reproduction, the read channel 4 supplies a sense current to the head 6 under the control of the micro controller 3, and receives via the read/write amplifier 5 the servo information and data which are reproduced from the magnetic disk 100 by the head 6, and supplies the reproduced servo information and data to the host unit via the HDC 1.

The micro controller 3 detects the position of the head 6 on the magnetic disk 100 based on the reproduced servo information, and controls the servo controller 7 so as to control the VCM 8 which moves the head 6. In addition, the servo controller 7 controls the spindle motor 9 which rotates the magnetic disk 100, so that the magnetic disk 100 rotates at 5400 rpm, for example.

The basic construction itself of the magnetic disk unit shown in FIG. 7 may be realized by a known construction. This embodiment is particularly characterized by the operation of the micro controller 3.

Figure 8:
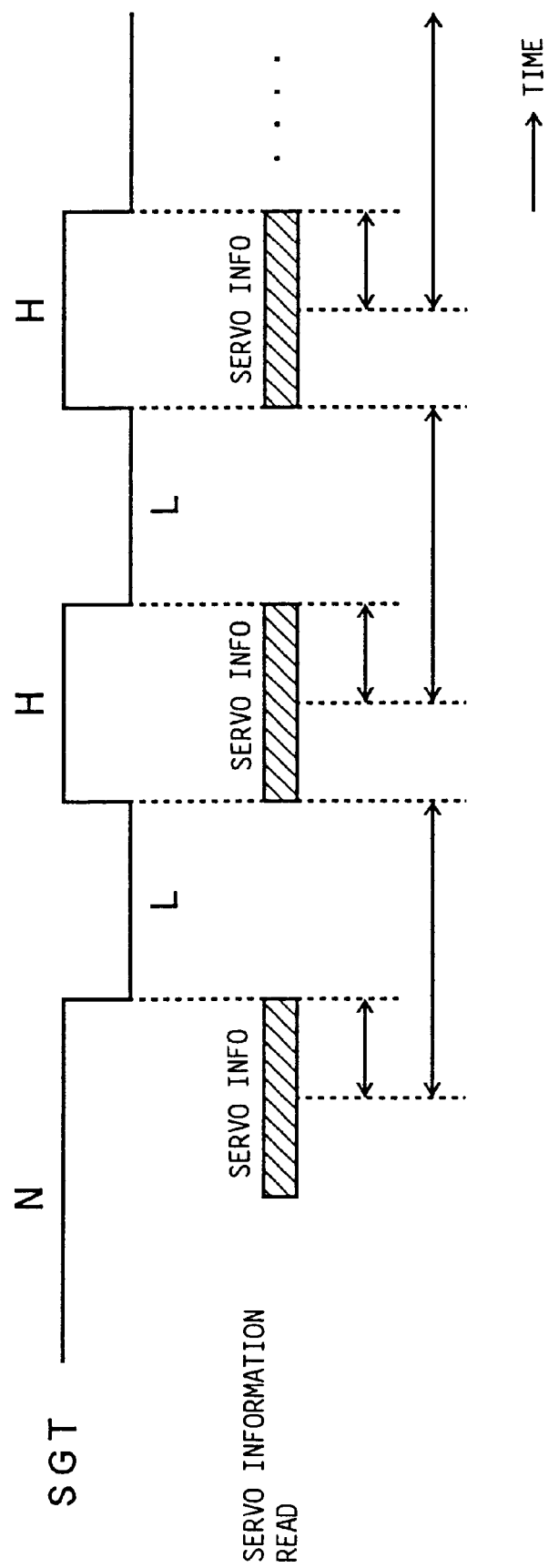
FIG. 8 is a diagram showing a servo gate signal generated by a micro controller and a read timing of the servo information.

FIG. 8 is a diagram showing a servo gate signal generated by the micro controller 3 and a read timing of the servo information. When the power of the magnetic disk unit is turned ON, the level of a servo gate signal SGT becomes high, and the head 6 makes a scan so as to search for the servo region 101 on the magnetic disk 100 by a control which is made via the servo controller 7. The HDC 1 extracts the servo information which is reproducing during a high-level period of the servo gate signal SGT, and controls the VCM 8 based on the reproduced servo information. At an end portion of the data region 102 which is located immediately before a servo region 101, information is recorded indicating that the servo region 101 exists immediately thereafter. For this reason, the micro controller 3 can recognize the position of the servo region 101 based on the reproduced data and/or servo information.

The servo information includes time information (timing) for making the level of the servo gate signal SGT low, and time information (timing) for making the level of the servo gate signal SGT high. Accordingly, when the servo information is read once from the servo region 101, the timings of the rising and falling edges of the servo gate signal SGT are automatically determined within the micro controller 3.

Figure 9:
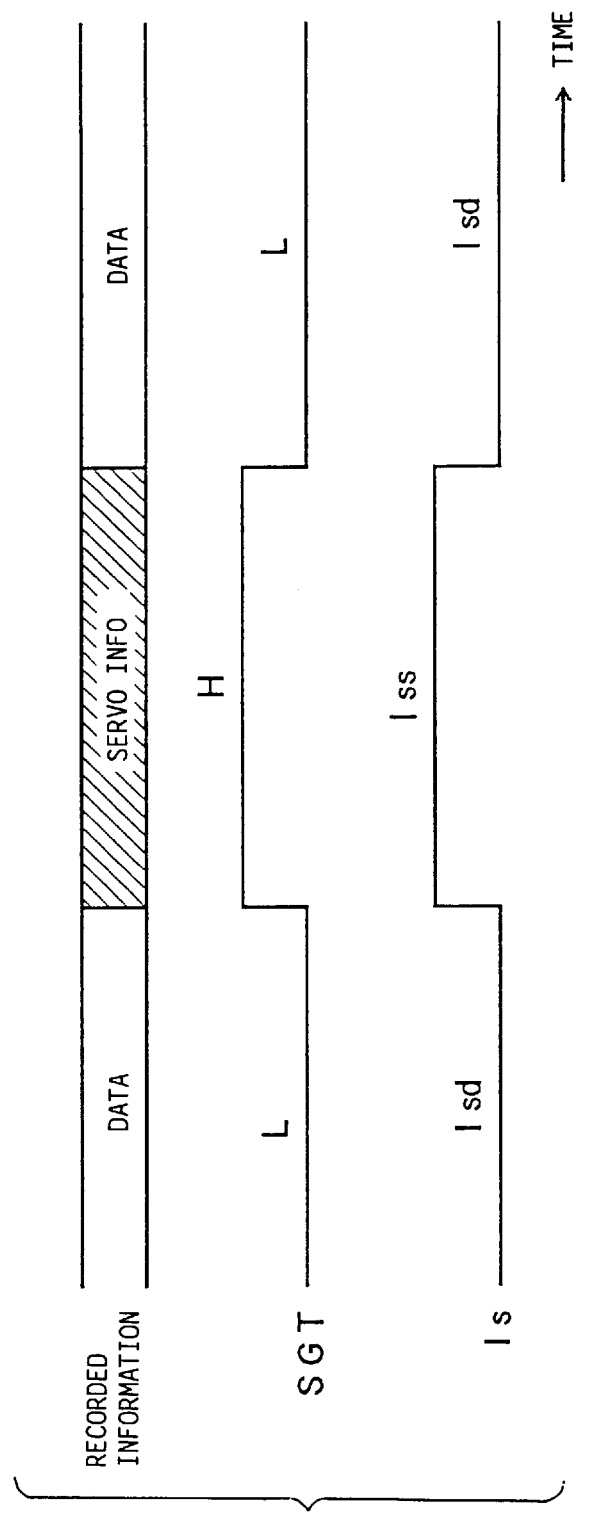
FIG. 9 is a diagram showing a relationship of the servo gate signal, information recorded on a magnetic disk, and a sense current.

FIG. 9 is a diagram showing a relationship of the servo gate signal SGT which is generated in the above described manner, information recorded on the magnetic disk 100, and a sense current Is. In FIG. 9, among the recorded information, the data is recorded in the data region 102 and the servo information is recorded in the servo region 101. The micro controller 3 determines a timing with which the sense current Is is supplied to the MR head of the head 6 is switched between a first value Isd and a second value Iss, based on the servo gate signal SGT. Hence, the sense current Is is set to the first value Isd when reproducing the data region 102, and is set to the second value Iss which is larger than the first value Isd when reproducing the servo region 101. For example, the first value Isd of the sense current Is is 8 mA, and the second value Iss is 10 mA.

The MR head has a characteristic such that the reproduced output level of the MR head becomes higher as the sense current Is supplied thereto becomes larger. Therefore, by setting the sense current Is at the time of reproducing the servo region 101 to the second value Iss which is larger than the first value Isd of the sense current Is at the time of reproducing the data region 102, it is possible to positively and accurately reproduce the servo information even if a side erase is generated.

Since the reproduced output level of the MR head becomes higher as the sense current Is supplied thereto becomes larger, it is conceivable to supply to the MR head a large sense current Is also when reproducing the data from the data region 102. However, when a large sense current Is is supplied to the MR head for a long period of time, the serviceable life of the MR head is shortened, and the power consumption of the magnetic disk unit increases considerably. For these reasons, it is desirable not to supply a large sense current Is to the MR head when reproducing the data from the data region 102. On the other hand, because this embodiment supplies a large sense current Is to the MR head only when reproducing the servo information from the servo region 101, there is essentially no effect on the serviceable life of the MR head, and the power consumption of the magnetic disk unit will not increase considerably.

In this embodiment, the first and second values Isd and Iss of the sense current Is are set to satisfy the following relationship, where RCW denotes an effective read core width of the head 6 (MR head), SEW denotes the width of the side erase included in the effective read core width RCW, Iss denotes the sense current which is supplied to the head 6 (MR head) when reproducing the servo information from the servo region 101, and Isd denotes the sense current which is supplied to the head 6 (MR head) when reproducing the data from the data region 102.

$$Iss \leq \{(RCW \cdot Isd)/(RCW-SEW)\}$$

Figure 10:
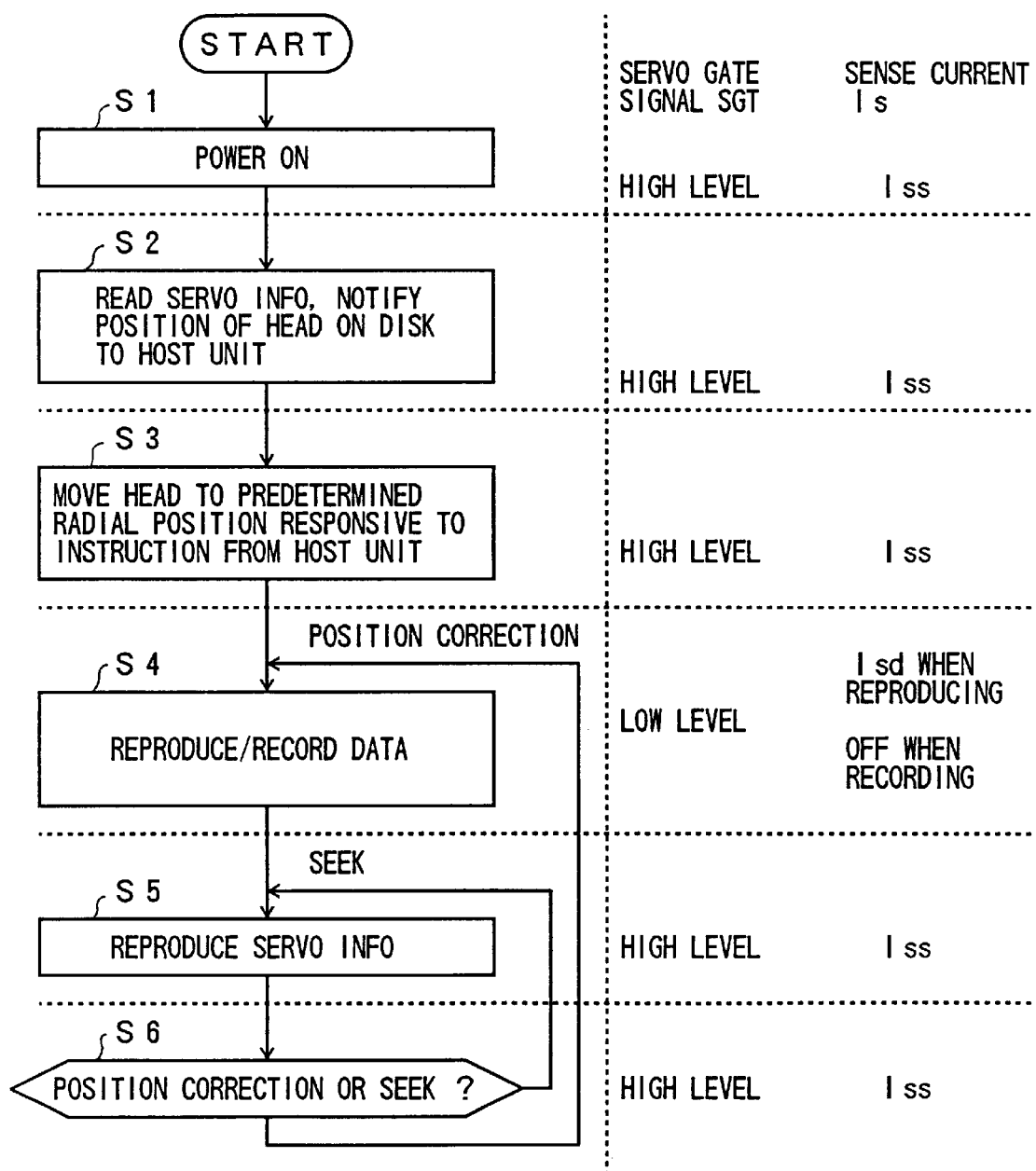
FIG. 10 is a flow chart for explaining an embodiment of a process carried out by the micro controller.

FIG. 10 is a flow chart for explaining a process carried out by the micro controller 3 in this embodiment. FIG. 10 also shows on the right side of the flow chart the level of the servo gate signal SGT and the set value of the sense current Is at various stages of the process.

In FIG. 10, a step S1 turns the power of the magnetic disk unit ON, and in this state, the servo gate signal SGT has a high level, and the sense current Is is set to the second value Iss. A step S2 receives the servo information which is reproduced from the servo region 101 by the head 6, via the read/write amplifier 5 and the read channel 4. In addition, the step S2 reads the reproduced servo information using the servo gate signal SGT so as to judge the position of the head 6 on the magnetic disk 100, and a judgement result is supplied to the host unit via the HDC 1. In this state also, the servo gate signal SGT has a high level, and the sense current Is is set to the second value Iss. A step S3 controls the VCM 8 via the servo controller 7 so as to move the head 6 to a predetermined radial position on the magnetic disk 100. In this state also, the servo gate signal SGT has a high level, and the sense current Is is set to the second value Iss.

A step S4 reproduces or records the data. When reproducing the data from the data region 102, the servo gate signal SGT has a low level, and the sense current Is is set to the first value Isd. On the other hand, when recording the data to the data region 102, the servo gate signal SGT has a low level, and the sense current Is is turned OFF. A step S5 reproduces the servo information from the servo region 101 by the head 6, and receives the reproduced servo information via the read/write amplifier 5 and the read channel 4. In this state, the servo gate signal SGT has a high level, and the sense current Is is set to the second value Iss. A step S6 decides whether to correct the position of the head 6 or to make a seek operation. When correcting the position of the head 6, the VCM 8 is controlled via the servo controller 7 so as to finely adjust the position of the head 6, and the process returns to the step S4 after the head 6 is controlled and positioned on a desired track on the magnetic disk 100. On the other hand, when making the seek operation, the VCM 8 is controlled via the servo controller 7, and the process returns to the step S5 after the head 6 is controlled and carries out a seek operation.

Figure 11:
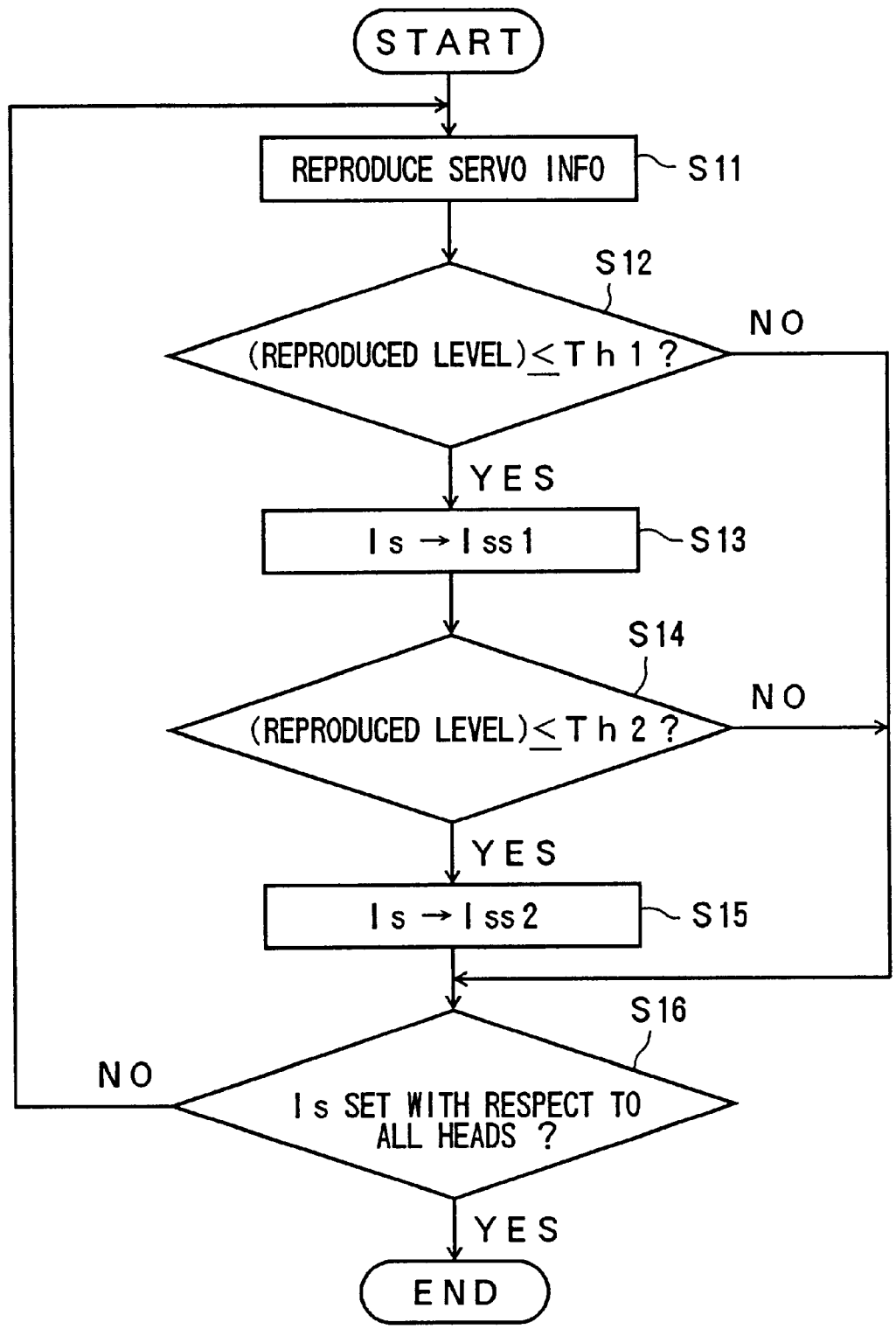
FIG. 11 is a flow chart for explaining another embodiment of the process carried out by the micro controller.

FIG. 11 is a flow chart for explaining another embodiment of the process carried out by the micro controller 3 in this embodiment. For the sake of convenience, FIG. 11 only shows the process from the time when the servo information is reproduced from the servo region 101. In addition, it is assumed for the sake of convenience that the magnetic disk unit is provided with a plurality of heads 6.

In FIG. 11, a step S11 reproduces the servo information from the servo region 101 by the head 6, and a step S12 decides whether or not the reproduced output level of the servo information is less than or equal to Th1. The process advances to a step S16 which will be described later if the decision result in the step S12 is NO. On the other hand, if the decision result in the step S12 is YES, a step S13 sets the sense current Is which is supplied to the head 6 (MR head) to a value Iss1. This value Iss1 is larger than the value Isd of the sense current Is which is supplied to the head 6 when reproducing the data from the data region 102.

A step S14 decides whether or not the reproduced output level of the servo information is less than or equal to Th2 which satisfies a relationship Th2<Th1. The process advances to the step S16 which will be described later if the decision result in the step S14 is NO. On the other hand, if the decision result in the step S14 is YES, a step S15 sets the sense current Is which is supplied to the head 6 (MR head) to a value Iss2. This value Iss2 is larger than the value Isd of the sense current Is which is supplied to the head 6 when reproducing the data from the data region 102, and is also larger than the value Iss1 described above.

If the decision result in the step S12 or S14 is NO or, after the step S15, the step S16 decides whether or not the sense current Is is set with respect to all of the heads 6, and the process returns to the step S11 if the decision result in the step S16 is NO. On the other hand, the process ends if the decision result in the step S16 is YES.

According to this embodiment, it is possible to set an optimum sense current Is depending on the reproduced output level of the servo information, and it is possible to extend the serviceable life of the MR head and to suppress an increase of the power consumption of the magnetic disk unit. Moreover, this embodiment can set an optimum sense current Is independently with respect to each of the heads 6.

In FIG. 11, the sense current Is is variably set in 2 stages, however, it is of course possible to variably set the sense current Is in 3 or more stages.

In addition, the above described operation of setting the value of the sense current Is supplied to the head 6 when reproducing the servo information to a value larger than that of the sense current Is supplied to the head 6 when reproducing the data may be carried out when a read error of the servo information is generated. In this case, it is possible to minimize the time for which a large sense current Is is supplied to the head 6, thereby reducing the power consumption of the magnetic disk unit and also extending the serviceable life of the head 6 (MR head).

Further, the present invention is not limited to these embodiments, but various variations and modifications may be made without departing from the scope of the present invention.

What is claimed is:

1. A servo information reproducing method for reproducing servo information from a recording medium by a head, where servo regions recorded with the servo information and data regions recorded with data coexist on the recording medium, said servo information reproducing method comprising:

a setting step setting a sense current which is supplied to the head when reproducing the servo information from the servo region to a value larger than that of a sense current which is supplied to the head when reproducing the data from the data region, said setting step variably setting the value of the sense current depending on a level of the servo information which is reproduced from the servo region so that the sense current is updated to a first value Iss1 if the level of the reproduced servo information is less than or equal to a first threshold level Th1, and is updated to a second value Iss2 if the level of the reproduced servo information is less than or equal to a second threshold level Th2, said first and second values Iss1 and Iss2 respectively being larger than a value of the sense current which is supplied to the head when reproducing data from the data region and satisfy a relationship Iss1<Iss2, and the first and second threshold levels Th1 and Th2 satisfy the relationship Th1>Th2.

2. The servo information reproducing method as claimed in claim 1, wherein said setting step is carried out only when a read error of the servo information is generated.

3. The servo information reproducing method as claimed in claim 1, wherein said setting step sets the value of the sense current to satisfy the following relationship:

$$Iss \leq \{(RCW \cdot Isd)/(RCW-SEW)\}$$

where RCW denotes an effective read core width of the head, SEW denotes a width of a side erase included in the effective read core width RCW, Iss denotes the sense current which is supplied to the head when reproducing the servo information from the servo region, and Isd denotes the sense current which is supplied to the head when reproducing the data from the data region.

4. The servo information reproducing method according to claim 1, wherein said variably setting of the value of the sense current defines a step of optimizing the level of the sense current wherein said step of variably setting the sense current according to said thresholds Th1 and Th2 is performed upon detection of a servo region regardless of the presence or absence of any read error.

5. The servo information reproducing method as claimed in claim 1, wherein said setting step sets the sense current which is supplied to the head when reproducing the servo information from the servo region independently with respect to a plurality of heads.

6. A magnetic disk unit for reproducing servo information and data from at least one magnetic disk on which servo regions recorded with the servo information and data region recorded with the data coexist, comprising:

at least one head reproducing the servo information and the data from the magnetic disk in response to a sense current; and a controller setting a value of the sense current which is supplied to said head when reproducing the servo information from the servo region to a first value which is larger than a second value of the sense current which is supplied to said head when reproducing the data from the data region, said controller variably setting the value of the sense current depending on a level of the servo information which is reproduced from the servo region, so that the sense current is updated to a first value Iss1 if the level of the reproduced servo information is less than or equal to a first threshold level Th1, and is updated to a second value Iss2 if the level of the reproduced servo information is less than or equal to a second threshold level Th2, where the first and second values Iss1 and Iss2 respectively are larger than a value of the sense current which is supplied to the head when reproducing the data from the data region and satisfy a relationship Iss1<Iss2, and the first and second threshold levels Th1 and Th2 satisfy a relationship Th1>Th2.

7. The magnetic disk unit as claimed in claim 6, wherein said controller sets the first value of the sense current only when a read error of the servo information is generated when reproducing the servo information from the servo region by said head.

8. The magnetic disk unit as claimed in claim 6, wherein said controller sets the first value of the sense current to satisfy the following relationship:

$$Iss \leq \{(RCW \cdot Isd)/(RCW-SEW)\}$$

where RCW denotes an effective read core width of the head, SEW denotes a width of a side erase included in the effective read core width RCW, Iss denotes the first value of the sense current, and Isd denotes the second value of the sense current.

9. The magnetic disk unit as claimed in claim 6, wherein said controller further performs said variably setting of the value of the sense current according to said thresholds Th1 and Th2 upon detection of a servo region regardless of the presence or absence of any read error.

10. The magnetic disk unit as claimed in claim 6, which comprises:

a plurality of heads reproducing the servo information and the data from the magnetic disk in response to the sense current, said controller independently setting the first value of the sense current with respect to said plurality of heads.

* * * * *